US 12,499,333 B1

(12) United States Patent
Don Crump

(10) Patent No.: US 12,499,333 B1
(45) Date of Patent: Dec. 16, 2025

(54) AUTONOMOUS JOURNALISM WITH ARTIFICIAL INTELLIGENCE AND SENSORY DATA PROCESSING

(71) Applicant: NewsGenie, Inc., Mesa, AZ (US)

(72) Inventor: Jeffrey Don Crump, Mesa, AZ (US)

(73) Assignee: NewsGenie, Inc., Mesa, AZ (US)

( * ) Notice: Subject to any disclaimer, the term of this patent is extended or adjusted under 35 U.S.C. 154(b) by 0 days.

(21) Appl. No.: 19/047,339

(22) Filed: Feb. 6, 2025

(51) Int. Cl.
*G06F 40/58* (2020.01)
*G06F 40/30* (2020.01)
*G06Q 30/0242* (2023.01)
*G06V 40/16* (2022.01)
*G10L 13/027* (2013.01)
*G10L 13/047* (2013.01)

(52) U.S. Cl.
CPC .............. *G06F 40/58* (2020.01); *G06F 40/30* (2020.01); *G06Q 30/0246* (2013.01); *G06V 40/172* (2022.01); *G10L 13/027* (2013.01); *G10L 13/047* (2013.01)

(58) Field of Classification Search
CPC .................................. G06F 40/58; G06F 40/30
See application file for complete search history.

(56) References Cited

U.S. PATENT DOCUMENTS

| | | | |
|---|---|---|---|
| 6,301,579 B1 * | 10/2001 | Becker | G06F 16/287 |
| | | | 707/999.102 |
| 11,977,854 B2 * | 5/2024 | Tunstall-Pedoe | G06N 3/0442 |
| 12,231,380 B1 * | 2/2025 | Rodgers | H04L 51/02 |
| 2002/0059069 A1 * | 5/2002 | Hsu | G10L 15/18 |
| | | | 704/E15.018 |
| 2017/0270805 A1 * | 9/2017 | Parker | G05D 1/0011 |
| 2017/0351962 A1 * | 12/2017 | Appel | G06N 7/01 |
| 2020/0226133 A1 * | 7/2020 | Li | G06F 16/2465 |
| 2021/0286635 A1 * | 9/2021 | Swvigaradoss | G06F 40/47 |
| 2023/0360519 A1 * | 11/2023 | Sudhir | G01C 21/3697 |
| 2024/0070899 A1 * | 2/2024 | Wagner | G06T 7/73 |
| 2024/0236018 A1 * | 7/2024 | Eldering | H04L 51/10 |
| 2025/0006182 A1 * | 1/2025 | Ingel | G10L 15/063 |

* cited by examiner

Primary Examiner — Scott C Anderson
(74) Attorney, Agent, or Firm — Esplin & Associates, PC

(57) ABSTRACT

Methods, systems, and devices for autonomous journalism with artificial intelligence and sensory data processing are described. In some examples, a server may receive real-time sensory data from various sources related to a news event. The server may process this data to create a structured news report by utilizing natural language processing and machine learning algorithms, which contextualize and verify the factual content of the news event. An autonomous reporting agent may be dispatched to the event's location in response to the processed sensory data. The server may then generate a dynamic news update that incorporates the autonomous agent's reporting and the structured news report, providing real-time, adaptive news coverage.

20 Claims, 8 Drawing Sheets

AUTONOMOUS JOURNALISM WITH ARTIFICIAL INTELLIGENCE AND SENSORY DATA PROCESSING

FIELD OF TECHNOLOGY

The present disclosure relates generally to database systems and data processing, and more specifically to autonomous journalism with artificial intelligence (AI) and sensory data processing.

BACKGROUND

In the field of journalism, advancements in digital technology have led to the integration of automation technologies to assist in news reporting tasks. These technologies may be utilized to create content, summarize data, and automate the aggregation of news from diverse sources.

SUMMARY

The described techniques relate to improved methods, systems, devices, and apparatuses that support techniques for autonomous journalism with AI and sensory data processing. In some examples, autonomous agents may be employed for real-time news reporting, equipped with advanced decision-making algorithms and sensory data processing capabilities, enabling them to dynamically generate unbiased news content. These agents, including AI-driven avatars, robotic reporters, and drones, may operate independently in a variety of environments, including high-risk areas, without the need for human intervention. This not only enhances the safety of news personnel by reducing their exposure to dangerous situations but also ensures continuous and scalable news coverage.

Furthermore, some implementations may incorporate bias mitigation mechanisms and fact verification models to deliver fact-based journalism. By cross-referencing multiple sources and utilizing explainable AI frameworks, some implementations may provide transparent and data-driven reporting, free from editorial bias. The autonomous agents may be capable of engaging with audiences, responding to live developments, and personalizing content delivery, thereby creating a more immersive and interactive news experience. Some implementations represent a transformative approach to journalism, bridging the gap between AI automation and human-like interaction in news broadcasting, and setting a new standard for objectivity, efficiency, and safety in news reporting.

A method for autonomous journalism with AI and sensory data processing is described. The method may include receiving, by a server, real-time sensory data from a plurality of sources associated with a news event. The method may include processing, by the server, the received sensory data to generate a structured news report by applying natural language processing and machine learning algorithms to contextualize and verify the factual content of the news event. The method may include dispatching, by the server, an autonomous reporting agent to the location of the news event in response to the processed sensory data. The method may include generating, by the server, a dynamic news update based on the reporting from the autonomous agent and the structured news report.

A system configured for autonomous journalism with AI and sensory data processing is described. The system may include a processor and memory coupled with the processor. The system may include instructions stored in the memory and executable by the processor to cause the system to receive real-time sensory data from a plurality of sources associated with a news event. The system may process the received sensory data to generate a structured news report by applying natural language processing and machine learning algorithms to contextualize and verify the factual content of the news event. The system may dispatch an autonomous reporting agent to the location of the news event in response to the processed sensory data. The system may generate a dynamic news update based on the reporting from the autonomous agent and the structured news report.

Another system for autonomous journalism with AI and sensory data processing is described. The system may include means for receiving real-time sensory data from a plurality of sources associated with a news event by a server. The system may include means for processing the received sensory data to generate a structured news report by applying natural language processing and machine learning algorithms to contextualize and verify the factual content of the news event by the server. The system may include means for dispatching an autonomous reporting agent to the location of the news event in response to the processed sensory data by the server. The system may include means for generating a dynamic news update based on the reporting from the autonomous agent and the structured news report by the server.

A non-transitory computer-readable medium storing code for autonomous journalism with AI and sensory data processing is described. The code may include instructions executable by a processor to receive real-time sensory data from a plurality of sources associated with a news event. The code may include instructions executable by a processor to process the received sensory data to generate a structured news report by applying natural language processing and machine learning algorithms to contextualize and verify the factual content of the news event. The code may include instructions executable by a processor to dispatch an autonomous reporting agent to the location of the news event in response to the processed sensory data. The code may include instructions executable by a processor to generate a dynamic news update based on the reporting from the autonomous agent and the structured news report.

Some examples of the method, systems, and non-transitory computer-readable medium described herein may further include operations, features, means, or instructions for cross-referencing the verified factual content with additional databases to enhance the accuracy of the structured news report in response to detecting inconsistencies in the received sensory data.

Some examples of the method, systems, and non-transitory computer-readable medium described herein may further include operations, features, means, or instructions for adapting the tone and depth of the dynamic news update based on real-time audience engagement metrics collected during the dissemination of the news report.

Some examples of the method, systems, and non-transitory computer-readable medium described herein may further include operations, features, means, or instructions for synthesizing speech and gestures for an AI-generated avatar to deliver the dynamic news update in a studio setting, in response to the structured news report being finalized.

Some examples of the method, systems, and non-transitory computer-readable medium described herein may further include operations, features, means, or instructions for translating the dynamic news update into multiple languages for simultaneous distribution across various media platforms in response to predefined user preferences.

Some examples of the method, systems, and non-transitory computer-readable medium described herein may further include operations, features, means, or instructions for deploying additional autonomous reporting agents equipped with environmental sensors to the location of the news event in response to the autonomous reporting agent's initial assessment.

Some examples of the method, systems, and non-transitory computer-readable medium described herein may further include operations, features, means, or instructions for dispatching an autonomous drone journalist equipped with a camera to provide aerial coverage of the location of interest, wherein the drone journalist captures live video footage for inclusion in the structured news report.

Some examples of the method, systems, and non-transitory computer-readable medium described herein may further include operations, features, means, or instructions for generating a personalized news update tailored to a user's preferences by analyzing the user's previous interactions with the news content and incorporating relevant topics into the structured news report.

Some examples of the method, systems, and non-transitory computer-readable medium described herein may further include operations, features, means, or instructions for integrating real-time interactive Q&A capabilities into the structured news report, allowing live audience members to submit questions and receive immediate, AI-generated responses related to the news content.

In some examples of the method, systems, and non-transitory computer-readable medium described herein, the autonomous reporting agent may be equipped with facial recognition technology to identify and interview key individuals at the news event for inclusion in the dynamic news update.

In some examples of the method, systems, and non-transitory computer-readable medium described herein, the server may apply sentiment analysis to the received sensory data to determine the emotional tone of the news event and adjust the presentation style of the dynamic news update accordingly.

In some examples of the method, systems, and non-transitory computer-readable medium described herein, the server may archive the structured news report with metadata tagging for enhanced searchability and retrieval in future news aggregation and synthesis.

In some examples of the method, systems, and non-transitory computer-readable medium described herein, the server may coordinate the autonomous reporting agent's movements with local authorities to ensure compliance with regulations and safety protocols during the coverage of the news event.

DETAILED DESCRIPTION

Figure 1:
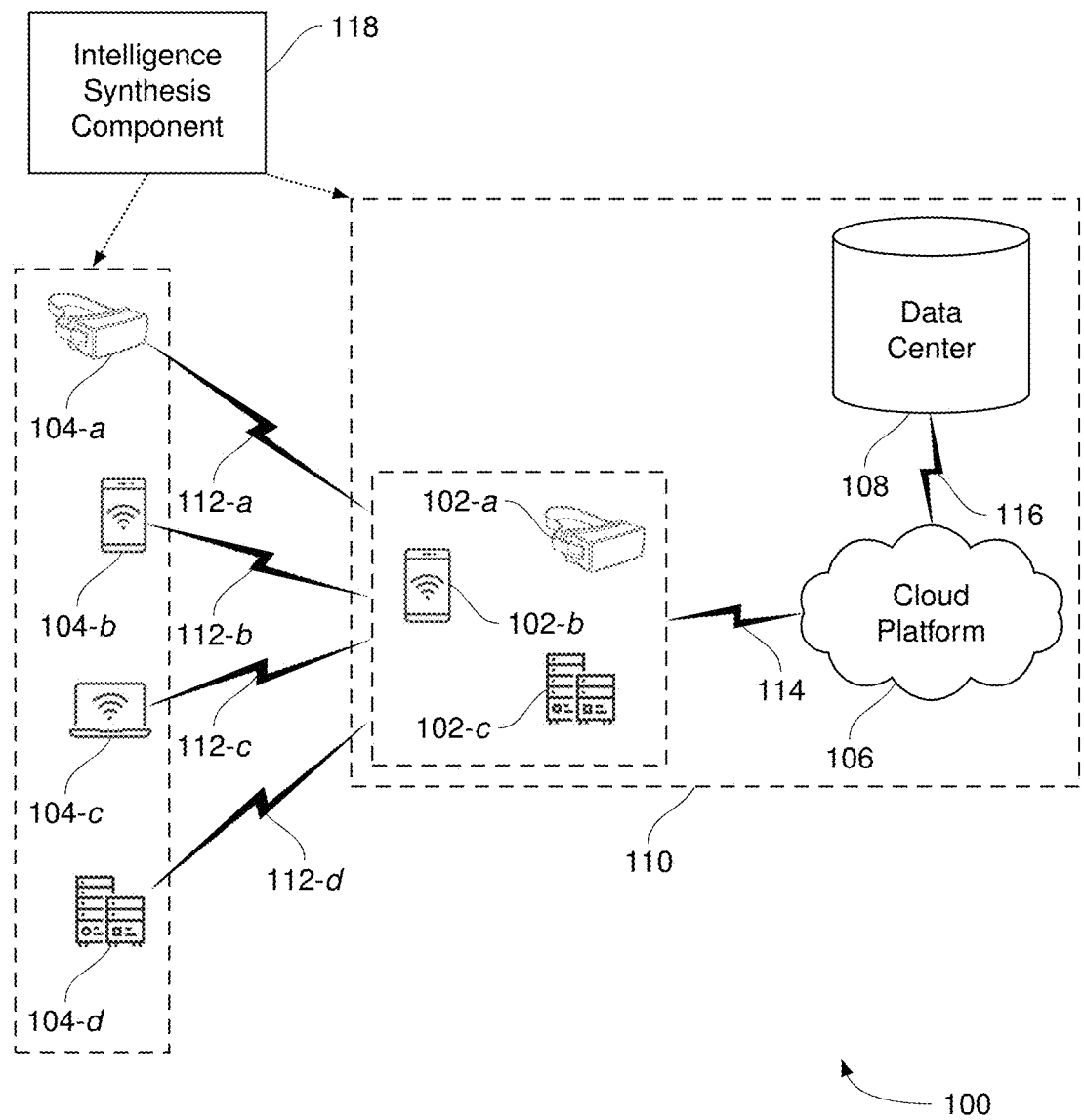
FIG. 1 illustrates an example of a system for data processing that supports autonomous journalism with AI and sensory data processing in accordance with aspects of the present disclosure.

Methods, systems, devices, and apparatuses that support techniques for autonomous journalism with AI and sensory data processing are disclosed. In some examples, current news content generation systems may be constrained by their lack of real-time adaptability and inability to autonomously engage in field reporting. These systems may fail to dynamically interpret unfolding events or interact fluidly with human counterparts, limiting their effectiveness in providing timely and comprehensive news coverage. Moreover, human journalists may be subject to biases and editorial influences that can affect the objectivity of news reporting. They also may face physical risks when reporting from conflict zones, natural disasters, or other hazardous environments. The need for continuous, unbiased, and safe news reporting presents a significant challenge in the modern media landscape, where the demand for real-time, scalable, and accurate news delivery is ever-increasing.

According to some implementations, a system may include AI and artificial general intelligence (AGI) driven journalism agents that perform real-time news reporting. These agents may consist of various types such as anchors, field reporters, panelists, debaters, and moderators, which may function independently or in coordination with human journalists. The system may provide real-time adaptive news coverage, with AI/AGI anchors capable of dynamically responding to live events.

Some implementations may feature autonomous field reporting using AI-driven avatars, robotic reporters, or sensor-equipped drones that can safely operate in hazardous environments. Bias mitigation mechanisms may be employed through AGI-enhanced data verification models that analyze and cross-reference global events without editorial influence. Advanced AI and AGI decision-making algorithms may be incorporated to mitigate human bias and enhance news objectivity.

The system may eliminate human bias in news presentation by using data-driven journalism models. Enhanced safety in field reporting may be achieved through AI-powered field reporters, robotic journalists, and autonomous avatars that can operate in dangerous locations. Real-time multimodal news generation may be possible, allowing for the automatic creation of synchronized video, text, and audio content across various platforms.

Audience engagement and personalization may be enhanced through AI-driven avatars and AGI-powered news systems that interact dynamically with audiences. The system may also enable crisis and emergency reporting with AI, where AI-powered reporters cover live emergencies. Production costs and efficiency may be improved as the system reduces reliance on human labor and costly studio infrastructure.

Misinformation may be mitigated as AI/AGI systems cross-reference multiple sources and verify facts in real-time. Unbiased, fact-based news reporting may be ensured by removing human editorial bias and political influence. AI-generated news avatars and reporters may include virtual or robotic AI entities that deliver studio-based news coverage and autonomous robotic journalists or drones that navigate live events.

AI-powered speech and gesture synthesis may enable natural language speech, expressions, and body movements for AI entities. Multilingual capabilities may allow AI avatars to deliver news in multiple languages in real-time. An AI fact verification and bias mitigation framework may be integrated to ensure trustworthy news.

AI/AGI-driven real-time reporting may ingest live video, audio, and text data to create dynamic news coverage. Interactive AI panelists and personalized news experiences may allow AI avatars and AGI-powered news agents to interact with live audiences and dynamically adjust storytelling depth. Scalable, cost-effective, and multimodal news production may be facilitated by the system, allowing for fully automated news production across multiple platforms.

Autonomous investigative journalism and data analysis may be enabled by AI and AGI systems that analyze massive datasets and uncover hidden insights. Ethical AI governance and transparency may be incorporated through Explainable AI models, ensuring transparent decision-making and verifiable news sources. AI-assisted hybrid newsrooms may feature AI reporters working alongside human journalists to assist in data collection, investigative research, and automated editing.

Technical and commercial applications of some implementations may span broadcast journalism, autonomous field journalism, AI-assisted investigative journalism, synthetic and interactive media production, and AI-powered fact-checking and bias mitigation. These applications may be utilized in various sectors, including media, digital broadcasting, and investigative journalism.

Aspects of the subject matter described in this disclosure can be implemented to realize one or more of the following potential advantages. The described techniques may be implemented to support a transformative approach to news dissemination, where the integration of AI and AGI may lead to a paradigm shift in how information is gathered, analyzed, and presented. The system may facilitate a more informed and engaged public by providing news coverage that is tailored to individual preferences and delivered through interactive platforms. The use of autonomous agents may significantly reduce the time between an event occurring and the public receiving news, potentially leading to more timely and effective responses to global events. The system may democratize access to information by delivering multilingual content, thereby reaching a wider audience and breaking down language barriers. By employing advanced algorithms for fact-checking, the system may uphold journalistic integrity and contribute to an informed society less susceptible to the spread of misinformation.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to autonomous journalism with AI and sensory data processing.

FIG. 1 illustrates an example of a system 100 that supports autonomous journalism with AI and sensory data processing in accordance with various aspects of the present disclosure. The system 100 includes cloud clients 102, user devices 104, a cloud platform 106, and a data center 108. Cloud platform 106 may be an example of a public or private cloud network. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a server (e.g., cloud client 102-*a*), a smartphone (e.g., cloud client 102-*b*), or a laptop (e.g., cloud client 102-*c*). In other examples, a cloud client 102 may be a desktop computer, a tablet, a sensor, or another computing device or system capable of generating, analyzing, transmitting, or receiving communications. In some examples, a cloud client 102 may be part of a business, an enterprise, a non-profit, a startup, or any other organization type.

A cloud client 102 may facilitate communication between the data center 108 and one or multiple user devices 104 to implement an online environment. The network connection 112 may include communications, opportunities, purchases, sales, or any other interaction between a cloud client 102 and a user device 104. The network connection 112 may include a wired connection, a wireless connection, or both. A cloud client 102 may access cloud platform 106 to store, manage, and process the data communicated via one or more network connections 112. In some cases, the cloud client 102 may have an associated security or permission level. A cloud client 102 may have access to certain applications, data, and database information within cloud platform 106 based on the associated security or permission level, and may not have access to others.

The user device 104 may include an intelligence synthesis component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-*a*, 112-*b*, 112-*c*, and 112-*d*) via a computer network. In an example, the user device 104 may be computing device such as a wearable device 104-*a*, a smartphone 104-*b*, a laptop 104-*c* or a server 104-*d*. In other cases, the user device 104 may be another computing system. In some cases, the user device 104 may be operated by a user or group of users. The user or group of users may be a customer, associated with a business, a manufacturer, or any other appropriate organization.

Cloud platform 106 may offer an on-demand database service to the cloud client 102. In some cases, cloud platform 106 may be an example of a multi-tenant database system. In this case, cloud platform 106 may serve multiple cloud clients 102 with a single instance of software. However, other types of systems may be implemented, including—but not limited to—client-server systems, mobile device systems, and mobile network systems. In some cases, cloud platform 106 may support an online application. This may include support for sales between buyers and sellers operating user devices 104, service, marketing of products posted by buyers, community interactions between buyers and sellers, analytics, such as user-interaction metrics, applications (e.g., computer vision and machine learning), and the Internet of Things (IoT). Cloud platform 106 may receive data associated with generation of an online environment from the cloud client 102 over network connection 114, and may store and analyze the data. In some cases, cloud platform 106 may receive data directly from a user device 104 and the cloud client 102. In some cases, the cloud client 102 may develop applications to run on cloud platform 106. Cloud platform 106 may be implemented using remote servers. In some cases, the remote servers may be located at one or more data centers 108.

Data center 108 may include multiple servers. The multiple servers may be used for data storage, management, and processing. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes. In some cases, the data stored at data center 108 may be backed up by copies of the data at a different data center (not pictured).

Server system 110 may include cloud clients 102, a cloud platform 106, an intelligence synthesis component 118, and a data center 108 that may coordinate with cloud platform 106 and data center 108 to implement an online environment. In some cases, data processing may occur at any of the components of server system 110, or at a combination of these components. Thus, the intelligence synthesis component 118 may be included in the user device 104, server system 110, or in part or in whole in both. In some cases, servers may perform the data processing. The servers may be a cloud client 102 or located at data center 108.

Some or all of the functionality attributed to the intelligence synthesis component 118 may be embodied or performed by one or more user devices 104, one or more components of server system 110 (e.g., cloud clients 102, a cloud platform 106, and/or a data center 108), and/or other components of system 100. The intelligence synthesis component 118 may receive signals and inputs from user device 104 directly. via cloud clients 102, and/or via cloud platform 106 or data center 116.

As described herein, the intelligence synthesis component 118 may be integral to the operation of system 100, facilitating the autonomous journalism process. The component 118 may receive real-time sensory data from various sources, which may include user devices 110, cloud clients 102, or other sensors not explicitly detailed in FIG. 1. Upon receiving this data, the intelligence synthesis component 118 may process it using natural language processing and machine learning algorithms to contextualize and verify the information related to a news event. This processing may occur within the user device 110, or it may be distributed across server system 110, including cloud clients 102, cloud platform 106, and data center 108. Once the structured news report is generated, the intelligence synthesis component 118 may dispatch an autonomous reporting agent to the event's location, which may be facilitated by the cloud platform 106. The intelligence synthesis component 118 may then continue to generate dynamic news updates based on the autonomous agent's reporting and the initial structured news report, ensuring that the system 100 provides continuous and up-to-date news content.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
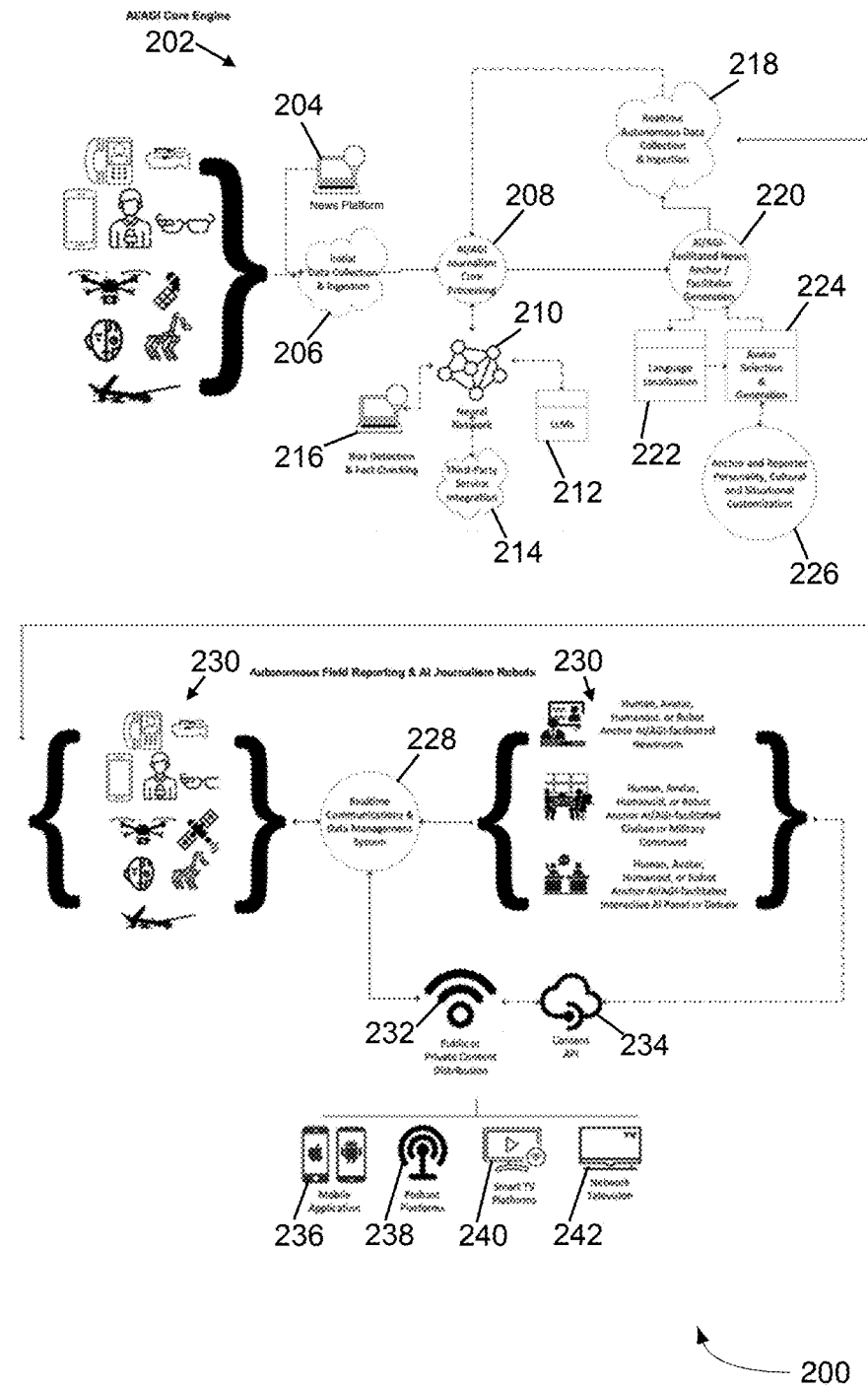
FIG. 2 shows an AI journalism system which supports techniques for autonomous journalism with AI and sensory data processing in accordance with various aspects of the present disclosure.

FIG. 2 shows an AI journalism system 200 which supports techniques for autonomous journalism with AI and sensory data processing in accordance with various aspects of the present disclosure. As depicted in FIG. 2, the AI journalism system 200 may include one or more of an AI/AGI core engine 202, a news platform 204, an initial data collection & ingestion 206, an AI/AGI journalism core processing 208, a neural network 210, an LLMS 212, a third-party service integration 214, a bias detection & fact checking 216, a real-time autonomous data collection & ingestion 218, an AI/AGI-facilitated news anchor/facilitator generation 220, a language localization 222, an avatar selection & generation 224, an anchor and reporter customization 226, a realtime communications & data management system 228, an autonomous field reporting & AI journalism robots 230, a public or private content distribution 232, a content application programming interface (API) 234, a mobile application 236, a podcast platforms 238, a smart TV platforms 240, a network television 242, and/or other components.

The AI/AGI core engine 202 may serve as the central processing unit for the AI journalism system 200. The AI/AGI core engine 202 may coordinate various AI-driven tasks and processes. The AI/AGI core engine 202 may be responsible for orchestrating the overall functionality of the AI journalism system 200. The AI/AGI core engine 202 may interact with other components such as the AI/AGI journalism core processing 208 to analyze and synthesize news content. An example of the AI/AGI core engine 202 could be a sophisticated software platform that integrates various AI modules for different journalistic tasks.

The news platform 204 may act as a specialized component within the AI journalism system 200. The news platform 204 may focus on bias detection and fact-checking functionalities. The news platform 204 may work in conjunction with the AI/AGI core engine 202 to maintain the integrity of the news content. The news platform 204 may utilize advanced algorithms to scrutinize content for potential biases and inaccuracies. An illustrative example of the news platform 204 might be a software tool that employs natural language processing to evaluate the neutrality of news articles.

The initial data collection & ingestion 206 may facilitate the gathering and integration of initial data into the AI journalism system 200 for analysis and reporting. The initial data collection & ingestion 206 may capture data from a variety of sources such as social media, sensors, and live broadcasts. The initial data collection & ingestion 206 may process data in various formats, including video, audio, and text.

The AI/AGI journalism core processing 208 may handle the analysis and synthesis of news content. The AI/AGI journalism core processing 208 may leverage AI capabilities for journalism applications. The AI/AGI journalism core processing 208 may process incoming data to create structured news reports. The AI/AGI journalism core processing 208 may be integral to transforming raw data into coherent and contextually relevant news stories. An alternative to the AI/AGI journalism core processing 208 could be a set of specialized AI algorithms designed for content creation and curation.

The neural network 210 may provide the AI journalism system 200 with machine learning capabilities. The neural network 210 may allow for pattern recognition and predictive analytics. The neural network 210 may be utilized by the AI/AGI core engine 202 to enhance decision-making processes. The neural network 210 may be trained on vast datasets to improve its accuracy over time. An example of the neural network 210 might be a deep learning model that identifies trends and anomalies in news-related data.

The LLMS 212 may manage the learning and memory storage functions within the AI journalism system 200. The LLMS 212 may aid in the system's adaptive learning processes. The LLMS 212 may store learned patterns and insights to inform future reporting. The LLMS 212 may be used to refine the AI journalism system 200's performance as more data is processed. An illustrative example of the LLMS 212 could be a database system that archives all the learning outcomes and preferences of the AI journalism system 200.

The third-party service integration 214 may include connections to external platforms and services to enhance data collection and distribution. The third-party service integration 214 may allow the AI journalism system to access additional data sources such as social media feeds, satellite imagery, and public databases. It may facilitate the dissemination of news content to various platforms, including social media, news websites, and mobile applications. The third-party service integration 214 may work with the public or private content distribution 232 to ensure that the news reaches a wide audience. In some implementations, the third-party service integration 214 may be linked with the content API 234 to streamline the integration process.

The bias detection & fact checking 216 may scrutinize news content to identify potential biases and inaccuracies. The bias detection & fact checking 216 may contribute to the integrity of the information processed by the system. The bias detection & fact checking 216 may employ various analytical tools to ensure the veracity of news reports. The bias detection & fact checking 216 may cross-reference information with trusted sources to validate news content. An example of the bias detection & fact checking 216 might be an automated verification system that flags questionable information for review.

The realtime autonomous data collection & ingestion 218 may facilitate the gathering and integration of live data feeds into the AI journalism system 200 for immediate analysis and reporting. The realtime autonomous data collection & ingestion 218 may capture data from a variety of sources such as social media, sensors, and live broadcasts. The realtime autonomous data collection & ingestion 218 may facilitate providing up-to-date news coverage. The realtime autonomous data collection & ingestion 218 may process data in various formats, including video, audio, and text. An illustrative example of the realtime autonomous data collection & ingestion 218 could be a network of interconnected sensors and data scrapers that continuously feed information to the AI journalism system 200.

The AI/AGI-facilitated news anchor/facilitator generation 220 may create virtual news anchors or facilitators that can interact with audiences and deliver news content generated by the AI journalism system 200. The AI/AGI-facilitated news anchor/facilitator generation 220 may utilize advanced graphics and animation technologies to produce lifelike avatars. The AI/AGI-facilitated news anchor/facilitator generation 220 may synthesize speech and gestures to mimic human presenters. The AI/AGI-facilitated news anchor/facilitator generation 220 may be designed to engage viewers with interactive content. An example of the AI/AGI-facilitated news anchor/facilitator generation 220 might be a digital platform that generates and controls virtual characters for live news broadcasts.

The language localization 222 may enable the AI journalism system 200 to translate and adapt news content for different linguistic audiences. The language localization 222 may broaden the system's global reach. The language localization 222 may incorporate translation algorithms to convert news content into multiple languages. The language localization 222 may be critical for disseminating news to a diverse audience base. An illustrative example of the language localization 222 could be a multilingual processing module that automatically localizes news reports for international distribution.

The avatar selection & generation 224 may allow for the customization and creation of digital personas that represent the AI journalism system 200 during news broadcasts. The avatar selection & generation 224 may offer a range of virtual characters to suit different news contexts and audience preferences. The avatar selection & generation 224 may integrate with the AI/AGI-facilitated news anchor/facilitator generation 220 to produce engaging news presentations. The avatar selection & generation 224 may be equipped with tools for modifying the appearance and voice of avatars. An example of the avatar selection & generation 224 might be a software suite that enables producers to design and deploy custom avatars for various news segments.

The anchor and reporter customization 226 may include parameters for tailoring virtual personalities to specific cultural and situational contexts. The anchor and reporter customization 226 may use behavioral algorithms to adjust the demeanor, tone, and style of virtual anchors and reporters. It may consider cultural norms, audience preferences, and situational factors to create a more relatable and effective news presentation. The anchor and reporter customization 226 may work with the AI/AGI-facilitated news anchor/facilitator generation 224 to implement these customizations. In some implementations, the anchor and reporter customization 226 may be integrated with the language localization 222 to ensure cultural relevance.

The real-time communications & data management system 228 may oversee the flow of information and communication within the AI journalism system 200. The realtime communications & data management system 228 may ensure timely and organized data handling. The realtime communications & data management system 228 may manage the distribution of news content to different platforms and services. The realtime communications & data management system 228 may be responsible for maintaining the synchronization of data across the AI journalism system 200. An illustrative example of the realtime communications & data management system 228 could be a centralized dashboard that tracks and coordinates all data-related activities within the AI journalism system 200.

The autonomous field reporting & AI journalism robots 230 may operate independently in various environments to gather news data. The autonomous field reporting & AI journalism robots 230 may reduce the need for human field reporters. The autonomous field reporting & AI journalism robots 230 may be equipped with cameras, sensors, and AI-driven analysis tools. The autonomous field reporting & AI journalism robots 230 may navigate challenging terrains and conditions to report on events. An example of the autonomous field reporting & AI journalism robots 230 might be a fleet of drones and robotic units that are deployed to cover natural disasters and other breaking news situations.

The public or private content distribution 232 may manage the dissemination of news content produced by the AI journalism system 200 to either public or selected private audiences. The public or private content distribution 232 may control access to news reports based on user credentials or subscription status. The public or private content distribution 232 may be configured to target specific demographic groups with tailored news content. The public or private content distribution 232 may be an integral part of the content delivery network of the AI journalism system 200. An illustrative example of the public or private content distribution 232 could be a digital platform that segments and delivers news feeds to various audience segments.

The content API 234 may provide an interface for external applications to access and utilize content generated by the AI journalism system 200. The content API 234 may facilitate the integration of news content into third-party applications and websites. The content API 234 may be designed to be compatible with a wide range of digital platforms. The content API 234 may allow developers to create custom news experiences using the data provided by the AI journalism system 200. An example of the content API 234 might be a set of programming interfaces that enable app developers to pull live news updates into their applications.

The mobile application 236 may offer a platform for mobile devices to receive and interact with news content from the AI journalism system 200. The mobile application 236 may provide users with personalized news feeds and notifications. The mobile application 236 may be optimized for various mobile operating systems and devices. The mobile application 236 may include features such as offline reading and user customization options. An illustrative example of the mobile application 236 could be a news app that aggregates content from the AI journalism system 200 and presents it in a user-friendly format on smartphones and tablets.

The podcast platforms 238 may distribute audio content produced by the AI journalism system 200 to various podcasting services and applications. The podcast platforms 238 may convert text-based news reports into audio formats. The podcast platforms 238 may reach audiences who prefer listening to news content. The podcast platforms 238 may be compatible with popular podcast directories and streaming services. An example of the podcast platforms 238 might be a network of podcast distribution channels that syndicate AI-generated news podcasts to listeners worldwide.

The smart TV platforms 240 may integrate the AI journalism system 200's content into smart television environments. The smart TV platforms 240 may allow for seamless access to news on these devices. The smart TV platforms 240 may be designed to work with various smart TV operating systems and interfaces. The smart TV platforms 240 may provide viewers with an interactive news viewing experience. An illustrative example of the smart TV platforms 240 could be a suite of apps that deliver real-time news updates and on-demand reports directly to connected televisions.

The network television 242 may broadcast news content generated by the AI journalism system 200 to traditional television networks and their audiences. The network television 242 may be part of a larger broadcast infrastructure. The network television 242 may reach viewers who consume news through conventional TV channels. The network television 242 may be equipped to handle the formatting and transmission requirements of traditional broadcasting. An example of the network television 242 might be a set of broadcast stations that air AI-curated news segments as part of their regular programming schedule.

In some implementations, the AI/AGI core engine 202 may serve as the central processing unit, orchestrating the various components of the system. The initial data collection and ingestion may be managed by news platform 204, which gathers information from diverse sources. This data may then be processed by the AI/AGI journalism core processing 208, which utilizes neural networks 210 and large language models (LLMs) 212 to interpret and analyze the incoming information. The system may integrate third-party services 214 to enhance its data processing capabilities.

The real-time autonomous data collection and ingestion 218 may continuously feed updated information into the system, which the AI/AGI-facilitated news anchor/facilitator generation 220 may use to create dynamic news content. Language localization 222 may ensure that the content is accessible in multiple languages, while avatar selection and generation 224 may create realistic AI news anchors and reporters. The anchor and reporter personality, cultural, and situational customization 226 may tailor these avatars to specific contexts, enhancing their relatability and effectiveness.

Autonomous field reporting and AI journalism robots 230 may operate in conjunction with the real-time communications and data management system 228 to provide live updates from various locations. The content generated may be distributed through public or private content distribution 232 channels, utilizing a content API 234 for seamless integration. This content may be accessible via mobile applications 236, podcast platforms 238, smart TV platforms 240, and network television 242, ensuring broad reach and accessibility.

According to some implementations, one or more components of the AI journalism system 200 may be the same as or similar to, or include aspects of, the methods, systems, devices, and apparatuses described in U.S. patent application Ser. No. 19/024,474, entitled "Transforming News Content For Bias Mitigation And Content Adjustment" and filed on Jan. 16, 2025, of which the entirety is incorporated by reference herein for all purposes.

Figure 3:
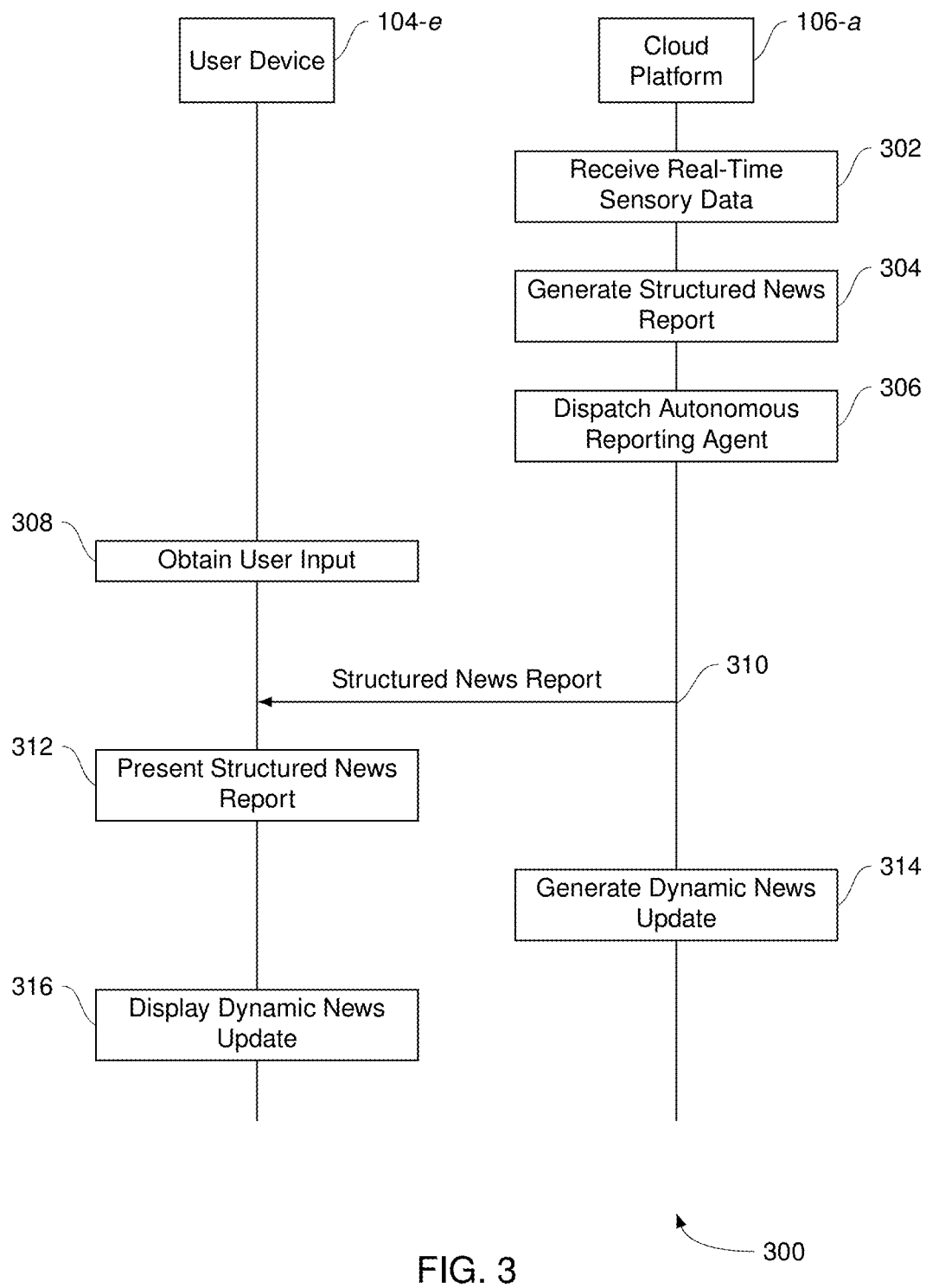
FIG. 3 illustrates an example of a process flow that supports autonomous journalism with AI and sensory data processing in accordance with various aspects of the present disclosure.

FIG. 3 illustrates an example of a process flow 300 that supports autonomous journalism with AI and sensory data processing in accordance with aspects of the present disclosure. In some examples, the process flow 300 may implement aspects of the system 100. For example, the process flow 300 may include a user device 104-*e* and a cloud platform 106-*a*, which may be examples of corresponding devices described herein. In some implementations, the method involves a cloud platform 106-*a* receiving and processing real-time sensory data from various sources to create and update a structured news report, which is then used to direct an autonomous reporting agent dispatched to the event location, while a user device 104-*e* may interact with the cloud platform 106-*a* to access or influence the reporting process.

At 302, the cloud platform 106-*a* may receive real-time sensory data from a plurality of sources associated with a news event. For example, the cloud platform 106-*a* may process data from social media feeds, emergency service communications, and satellite imagery to construct a comprehensive view of the news event. In some implementations, the cloud platform 106-*a* may analyze the received data to determine the relevance and newsworthiness of the information before disseminating it to AI-driven news anchors for reporting. The cloud platform 106-a may also compare incoming data against historical data to determine the significance of the news event in the context of similar past events.

At 304, the cloud platform 106-a may process the received sensory data to generate a structured news report by applying natural language processing and machine learning algorithms to contextualize and verify the factual content of the news event. For example, the cloud platform 106-a may use machine learning algorithms to identify key entities and events within the sensory data to ensure that the news report reflects the most significant aspects of the news event. In some implementations, the cloud platform 106-a may apply natural language processing to interpret the sentiment and tone of textual data, which may contribute to the overall tone of the structured news report. The cloud platform 106-a may also compare the sensory data against a database of known facts to verify the accuracy of the information before it is included in the news report.

At 306, the cloud platform 106-a may dispatch an autonomous reporting agent to the location of the news event in response to the processed sensory data. For example, the autonomous reporting agent may be an AI-powered drone equipped with cameras and sensors to capture live footage and environmental data from the scene. In some implementations, the cloud platform 106-a may select the type of autonomous reporting agent based on the nature of the news event, such as deploying a ground-based robotic reporter for events occurring in urban areas with dense populations. The autonomous reporting agent may then navigate to the event location using GPS and real-time traffic data to avoid delays and ensure timely arrival.

At 308, the user device 104-e may obtain user input to interact with the cloud platform 106-a regarding the news event. For example, the user device 104-e may receive a touch input or a voice command from a user seeking to access the latest updates on a developing story. In some implementations, the user device 104-e may present a graphical user interface allowing the user to select specific aspects of the news event they are interested in, such as related video content or expert analysis. The user device 104-e may then transmit the user's selection to the cloud platform 106-a, which may in turn provide the requested information back to the user device 104-e for display.

At 310, the cloud platform 106-a may transmit the structured news report to the user device 104-e. For example, the transmission may occur over a secure network connection to ensure the integrity of the news report. In some implementations, the cloud platform 106-a may use encryption protocols when sending the report to the user device 104-e to protect the data from unauthorized access. The user device 104-e may then receive and display the news report, allowing the user to interact with the content.

At 312, the user device 104-e may present the structured news report to the user. For example, the user device 104-e may utilize a display interface to visually render the structured news report for the user to read. In some implementations, the user device 104-e may employ audio output components to provide an auditory presentation of the news report, where text-to-speech technology may convert the text of the structured news report into spoken words. Alternatively, the user device 104-e may offer interactive elements within the presentation, allowing the user to engage with the news report by expanding sections for more detailed information or accessing related multimedia content.

At 314, the cloud platform 106-a may generate a dynamic news update based on the reporting from the autonomous agent and the structured news report. For example, the cloud platform 106-a may incorporate live video feeds from the autonomous agent that is positioned at the scene of a breaking news event, integrating this footage into the dynamic news update to provide visual context. In some implementations, the cloud platform 106-a may use sentiment analysis to gauge public reaction to the news event on social media platforms and reflect this in the dynamic news update. The cloud platform 106-a may also adjust the presentation style of the dynamic news update to cater to the preferences of different user segments, such as providing a more detailed analysis for expert audiences or a summarized version for casual viewers.

At 316, the user device 104-e may display the dynamic news update to the user. For example, the user device 104-e may utilize a graphical user interface to visually present the dynamic news update, which may include text, images, and video content related to the news event. In some implementations, the user device 104-e may offer interactive elements within the display, allowing the user to navigate through different sections of the dynamic news update or to access related news articles and live feeds. Additionally, the user device 104-e may provide options for the user to share the dynamic news update on social media platforms or save the update for later review.

Figure 4:
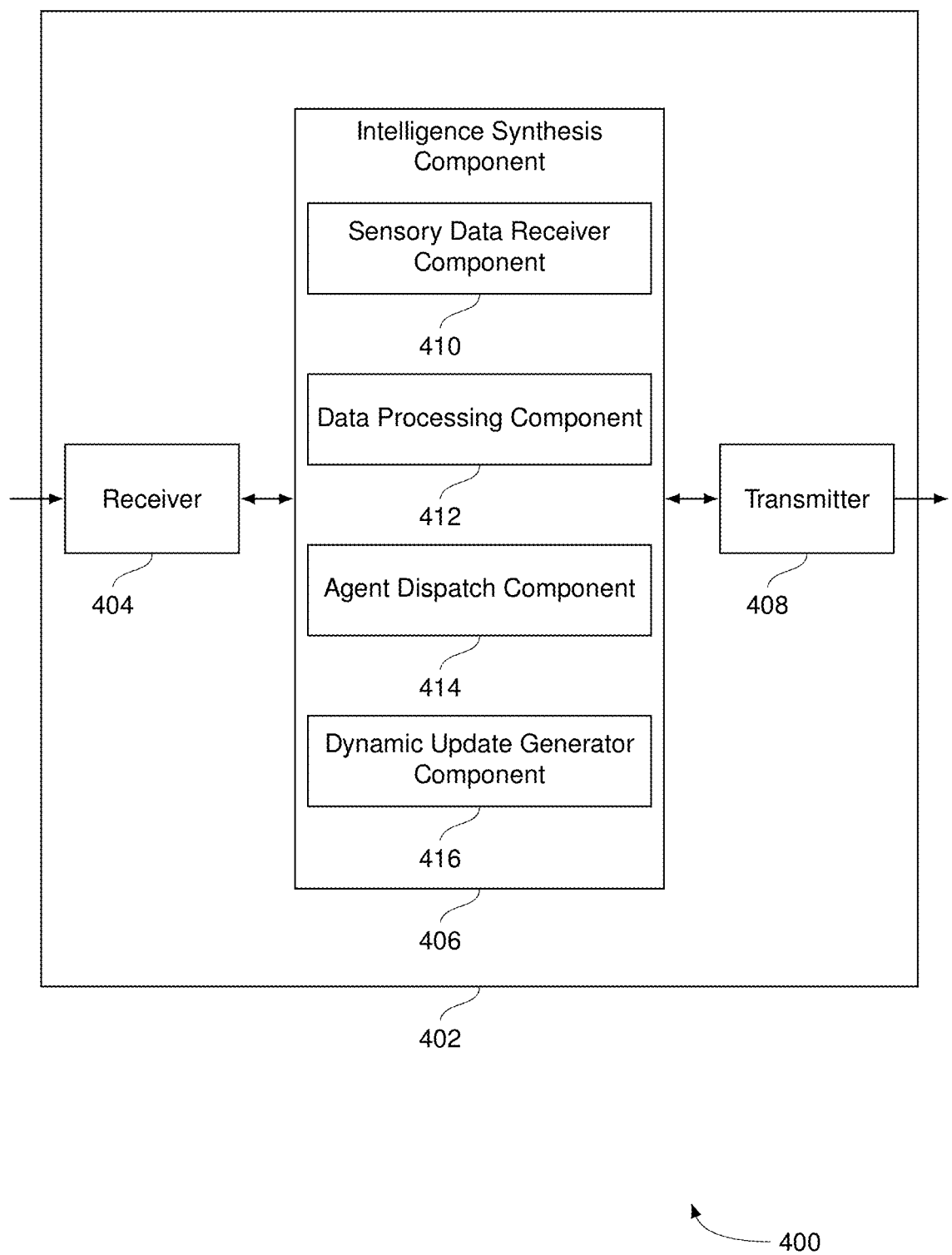
FIG. 4 shows a block diagram of an apparatus that supports autonomous journalism with AI and sensory data processing in accordance with various aspects of the present disclosure.

FIG. 4 shows a block diagram 400 of an apparatus 402 that supports autonomous journalism with AI and sensory data processing in accordance with various aspects of the present disclosure. The apparatus 402 may include an input module 404, intelligence synthesis component 406, and an output module 408. The apparatus 402 may also include a processor. Each of these components may be in communication with one another (e.g., via one or more buses). In some cases, the apparatus 402 may be an example of a user terminal, a database server, or a system containing multiple computing devices.

The input module 404 may manage input signals for the apparatus 402. For example, the input module 404 may identify input signals based on an interaction with a modem, a keyboard, a mouse, a touchscreen, or a similar device. These input signals may be associated with user input or processing at other components or devices. In some cases, the input module 404 may utilize an operating system such as iOS®, ANDROID®, MS-DOS®, MS-WINDOWS®, OS/2®, UNIX®, LINUX®, or another known operating system to handle input signals. The input module 404 may send aspects of these input signals to other components of the apparatus 402 for processing. For example, the input module 404 may transmit input signals to the intelligence synthesis component 406 to support face detection to address privacy in publishing image datasets. In some cases, the input module 404 may be a component of an input/output (I/O) controller 606 as described with reference to FIG. 6.

The intelligence synthesis component 406 may include one or more of a sensory data receiver component 410, a data processing component 412, an agent dispatch component 414, a dynamic update generator component 416, and/or other components. The intelligence synthesis component 406 may be an example of aspects of the intelligence synthesis component 502 or 604 described with reference to FIGS. 5 and 6.

The sensory data receiver component 410 may be configured as or otherwise support a means for receiving, by a server, real-time sensory data from a plurality of sources associated with a news event. The data processing component 412 may be configured as or otherwise support a means for processing, by the server, the received sensory data to generate a structured news report by applying natural language processing and machine learning algorithms to contextualize and verify the factual content of the news event. The agent dispatch component 414 may be configured as or otherwise support a means for dispatching, by the server, an autonomous reporting agent to the location of the news event in response to the processed sensory data. The dynamic update generator component 416 may be configured as or otherwise support a means for generating, by the server, a dynamic news update based on the reporting from the autonomous agent and the structured news report in some implementations.

The output module 408 may manage output signals for the apparatus 402. For example, the output module 408 may receive signals from other components of the apparatus 402, such as the intelligence synthesis component 406, and may transmit these signals to other components or devices. In some specific examples, the output module 408 may transmit output signals for display in a user interface, for storage in a database or data store, for further processing at a server or server cluster, or for any other processes at any number of devices or systems. In some cases, the output module 408 may be a component of an I/O controller 606 as described with reference to FIG. 6.

Figure 5:
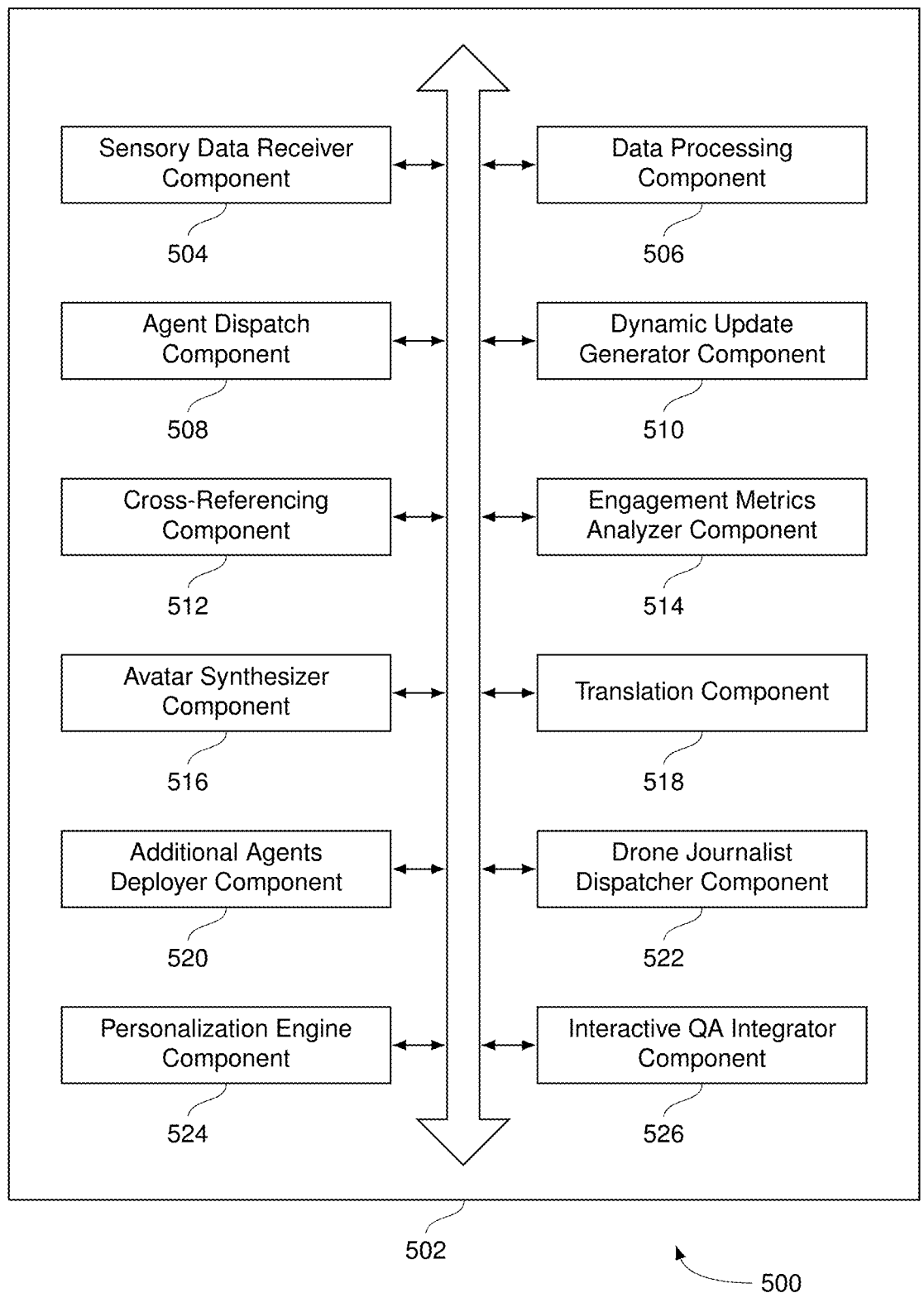
FIG. 5 shows a block diagram of an intelligence synthesis component that supports autonomous journalism with AI and sensory data processing in accordance with various aspects of the present disclosure.

FIG. 5 shows a block diagram 500 of an intelligence synthesis component 502 that supports autonomous journalism with AI and sensory data processing in accordance with various aspects of the present disclosure. The intelligence synthesis component 502 may be an example of aspects of an intelligence synthesis component 406, an intelligence synthesis component 604, or both, as described herein. The intelligence synthesis component 502, or various components thereof, may be an example of means for performing various aspects of autonomous journalism with AI and sensory data processing as described herein. For example, the intelligence synthesis component 502 may include one or more of a sensory data receiver component 504, a data processing component 506, an agent dispatch component 508, a dynamic update generator component 510, a cross-referencing component 512, an engagement metrics analyzer component 514, an avatar synthesizer component 516, a translation component 518, an additional agents deployer component 520, a drone journalist dispatcher component 522, a personalization engine component 524, an interactive Q&A integrator component 526, and/or other components. Each of these components may communicate, directly or indirectly, with one another (e.g., via one or more buses).

The sensory data receiver component 504 may be configured as or otherwise support a means for receiving, by a server, real-time sensory data from a plurality of sources associated with a news event. In some implementations, the sensory data receiver component 504 may receive data from sources such as environmental sensors, social media feeds, or satellite imagery. The sensory data receiver component 504 may process this data to determine the relevance and newsworthiness of the information received. The sensory data receiver component 504 may be capable of handling various data formats, including video, audio, and textual data streams.

The data processing component 506 may be configured as or otherwise support a means for processing, by the server, the received sensory data to generate a structured news report by applying natural language processing and machine learning algorithms to contextualize and verify the factual content of the news event. In some implementations, the data processing component 506 may apply machine learning algorithms that have been trained on a dataset of historical news events to identify patterns and correlations. The data processing component 506 may use natural language processing to interpret the textual data within the sensory input, such as transcribing spoken words from a video feed. The data processing component 506 may apply context-aware filters to determine the relevance of the sensory data to the news event being reported.

The agent dispatch component 508 may be configured as or otherwise support a means for dispatching, by the server, an autonomous reporting agent to the location of the news event in response to the processed sensory data. In some implementations, the autonomous reporting agent may be an AI-powered drone journalist equipped with cameras and sensors. The autonomous reporting agent may be capable of navigating to the news event location using GPS and real-time traffic data. The agent may gather visual and audio information from the scene to be transmitted back to the server for further analysis.

The dynamic update generator component 510 may be configured as or otherwise support a means for generating, by the server, a dynamic news update based on the reporting from the autonomous agent and the structured news report. In some implementations, the dynamic update generator component 510 may utilize machine learning algorithms to analyze the content provided by the autonomous agent. The dynamic update generator component 510 may then format this analysis into a dynamic news update that is ready for distribution. The dynamic update generator component 510 may also be capable of integrating multimedia elements from the autonomous agent's reporting into the dynamic news update.

In some examples, the cross-referencing component 512 may be configured as or otherwise support a means for cross-referencing, by the server, the verified factual content with additional databases to enhance the accuracy of the structured news report in response to detecting inconsistencies in the received sensory data. The cross-referencing component 512 may access databases containing historical data, which may include past news reports, scientific data, or statistical databases. The cross-referencing component 512 may also access real-time data streams from financial markets, weather forecasts, or social media trends to corroborate the factual content. In some implementations, the cross-referencing component 512 may compare the received sensory data with information from international news agencies to ensure global event coverage is consistent and accurate.

In some examples, the engagement metrics analyzer component 514 may be configured as or otherwise support a means for adapting, by the server, the tone and depth of the dynamic news update based on real-time audience engagement metrics collected during the dissemination of the news report. The engagement metrics analyzer component 514 may determine the level of audience interaction by analyzing metrics such as view counts, duration of views, and user comments. The engagement metrics analyzer component 514 may adjust the presentation style of the AI news anchor to maintain viewer interest, such as altering the anchor's speech cadence or the complexity of language used. The engagement metrics analyzer component 514 may also modify the content of the dynamic news update to include more detailed explanations or summaries to align with audience preferences indicated by the engagement metrics.

In some examples, the avatar synthesizer component 516 may be configured as or otherwise support a means for synthesizing, by the server, speech and gestures for an AI-generated avatar to deliver the dynamic news update in a studio setting, in response to the structured news report being finalized. The avatar synthesizer component 516 may utilize advanced machine learning algorithms to generate lifelike speech patterns that correspond with the news content. The component 516 may also be capable of creating realistic facial expressions and hand gestures that accompany the AI-generated avatar's speech, providing a more natural presentation of the news. In some implementations, the synthesized gestures may be tailored to match the tone of the news being reported, whether it's a serious topic or a lighter news story.

In some examples, the translation component 518 may be configured as or otherwise support a means for translating, by the server, the dynamic news update into multiple languages for simultaneous distribution across various media platforms in response to predefined user preferences. The translation component 518 may utilize advanced machine learning algorithms to maintain the nuances of the original content while translating into different languages. The component 518 may support real-time translation to enable immediate dissemination of news updates globally. The translation process may be tailored to adhere to regional linguistic variations, ensuring that the news is accessible and understandable to a diverse audience.

In some examples, the additional agents deployer component 520 may be configured as or otherwise support a means for deploying, by the server, additional autonomous reporting agents equipped with environmental sensors to the location of the news event in response to the autonomous reporting agent's initial assessment. The additional autonomous reporting agents may be equipped with various types of environmental sensors, such as thermal imaging cameras, which may be used to assess fire situations in real-time. In some implementations, the additional autonomous reporting agents may include drones that may be rapidly deployed to provide aerial views of the event. These agents may be capable of operating under a range of environmental conditions, such as extreme weather, to gather pertinent data.

In some examples, the drone journalist dispatcher component 522 may be configured as or otherwise support a means for dispatching an autonomous drone journalist equipped with a camera to provide aerial coverage of the location of interest. The drone journalist dispatcher component 522 may utilize communication protocols to send operational commands to the autonomous drone journalist. The autonomous drone journalist may be equipped with advanced navigation systems to reach and maneuver over the specified location. The drone journalist may have the capability to adjust its flight pattern based on environmental conditions to maintain optimal coverage of the event.

In some examples, the personalization engine component 524 may be configured as or otherwise support a means for generating a personalized news update tailored to a user's preferences by analyzing the user's previous interactions with the news content and incorporating relevant topics into the structured news report. The personalization engine component 524 may utilize machine learning algorithms to identify patterns in the user's interaction history. The personalization engine component 524 may then select topics for the news update that align with the identified patterns. In some implementations, the personalization engine component 524 may adjust the depth of coverage on certain topics within the news update based on the user's demonstrated interest levels.

In some examples, the interactive Q&A integrator component 526 may be configured as or otherwise support a means for integrating real-time interactive Q&A capabilities into the structured news report, allowing live audience members to submit questions and receive immediate, AI-generated responses related to the news content. The interactive Q&A integrator component 526 may allow for the collection of audience questions through various digital platforms, such as social media or a dedicated news portal. The component 526 may process these questions and determine which ones will be addressed by the AI-generated avatars during the news broadcast. The interactive Q&A integrator component 526 may prioritize questions based on relevance to the current news topics or the frequency of similar questions being asked by the audience.

Figure 6:
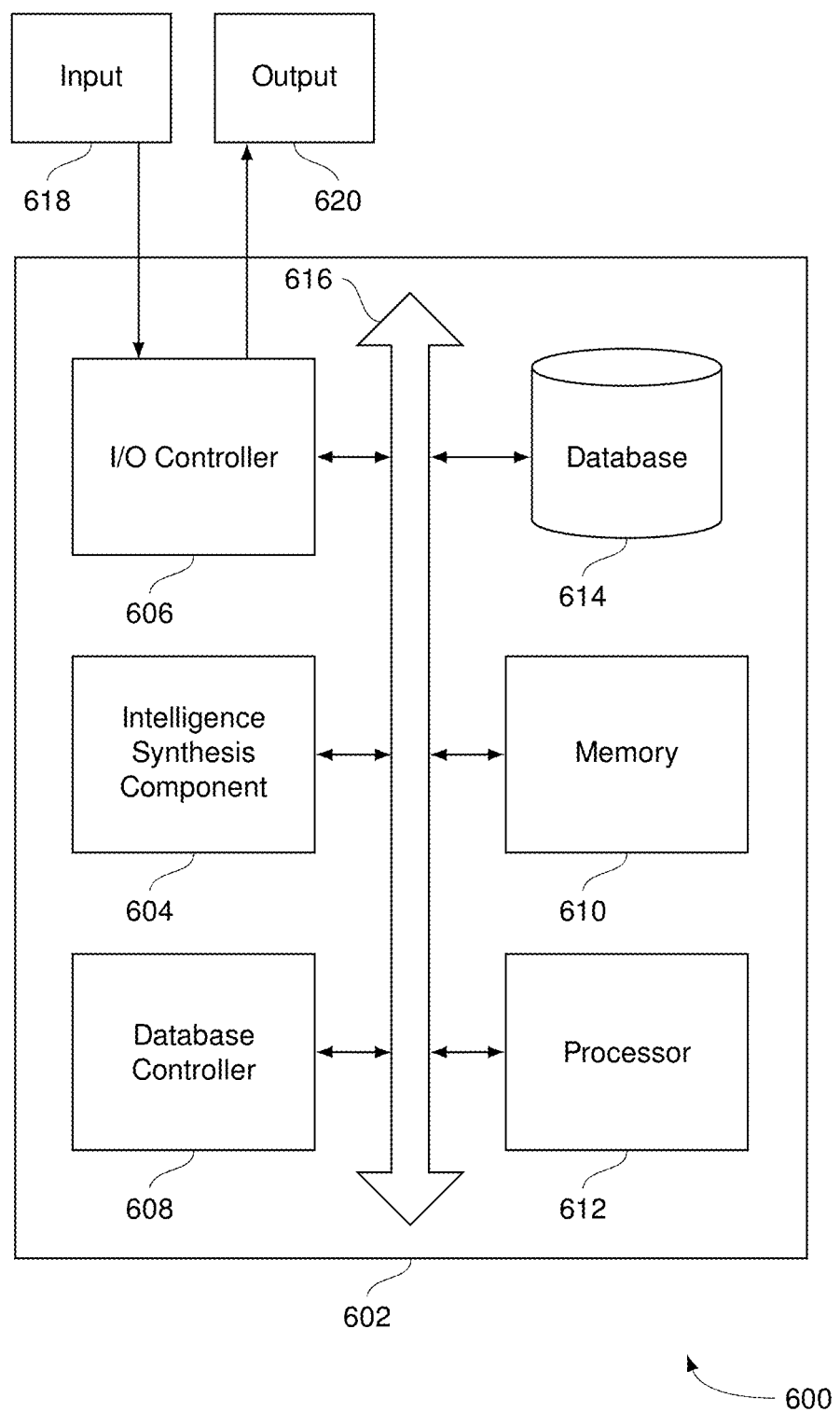
FIG. 6 shows a diagram of a system including a device that supports autonomous journalism with AI and sensory data processing in accordance with various aspects of the present disclosure.

FIG. 6 shows a diagram of a system 600 including a device 602 that supports autonomous journalism with AI and sensory data processing in accordance with aspects of the present disclosure. The device 602 may be an example of or include the components of a database server or an apparatus 402 as described herein. The device 602 may include components for bi-directional data communications including components for transmitting and receiving communications, including an intelligence synthesis component 604, an I/O controller 606, a database controller 608, memory 610, a processor 612, and a database 614. These components may be in electronic communication via one or more buses (e.g., bus 616).

The intelligence synthesis component 604 may be an example of an intelligence synthesis component 406 or 502 as described herein. For example, the intelligence synthesis component 604 may perform any of the methods or processes described above with reference to FIGS. 4 and 5. In some cases, the intelligence synthesis component 604 may be implemented in hardware, software executed by a processor, firmware, or any combination thereof.

The I/O controller 606 may manage input signals 618 and output signals 620 for the device 602. The I/O controller 606 may also manage peripherals not integrated into the device 602. In some cases, the I/O controller 606 may represent a physical connection or port to an external peripheral. In some cases, the I/O controller 606 may utilize an operating system such as iOS®, ANDROID®, MS-DOS®, MS-WINDOWS®, OS/2®, UNIX®, LINUX®, or another known operating system. In other cases, the I/O controller 606 may represent or interact with a modem, a keyboard, a mouse, a touchscreen, or a similar device. In some cases, the I/O controller 606 may be implemented as part of a processor. In some cases, a user may interact with the device 602 via the I/O controller 606 or via hardware components controlled by the I/O controller 606.

The database controller 608 may manage data storage and processing in a database 614. In some cases, a user may interact with the database controller 608. In other cases, the database controller 608 may operate automatically without user interaction. The database 614 may be an example of a single database, a distributed database, multiple distributed databases, a data store, a data lake, or an emergency backup database.

Memory 610 may include random-access memory (RAM) and read-only memory (ROM). The memory 610 may store computer-readable, computer-executable software including instructions that, when executed, cause the processor to perform various functions described herein. In some cases, the memory 610 may contain, among other things, a basic input/output system (BIOS) which may control basic hardware or software operation such as the interaction with peripheral components or devices.

The processor 612 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 612 may be configured to operate a memory array using a memory controller. In other cases, a memory controller may be integrated into the processor 612. The processor 612 may be configured to execute computer-readable instructions stored in a memory 610 to perform various functions (e.g., functions or tasks supporting autonomous journalism with AI and sensory data processing).

Figure 7:
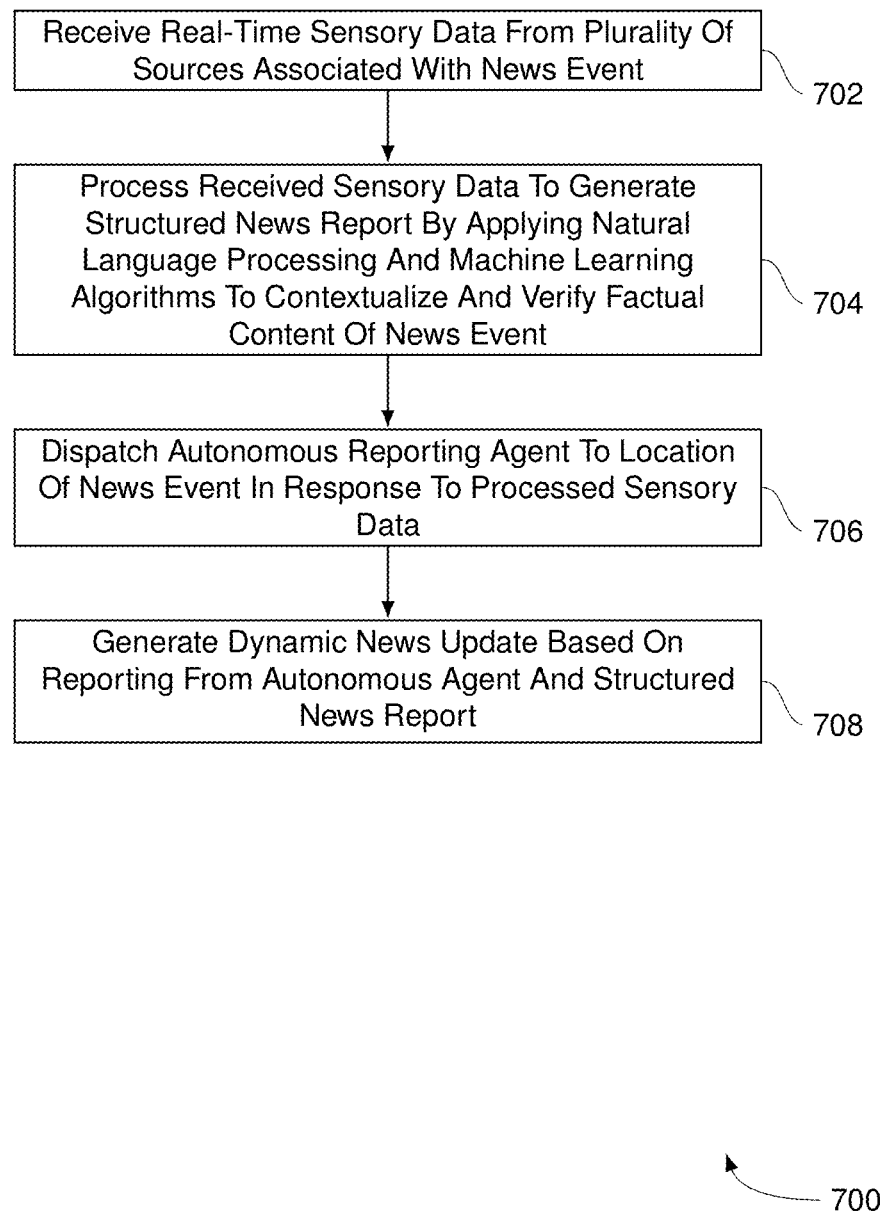
FIGS. 7 and 8 show flowcharts illustrating methods that support autonomous journalism with AI and sensory data processing in accordance with various aspects of the present disclosure.

FIG. 7 shows a flowchart illustrating a method 700 that supports autonomous journalism with AI and sensory data processing in accordance with various aspects of the present disclosure. The operations of the method 700 may be implemented by one or more components of a networked computing system as described herein. For example, the operations of the method 700 may be performed by an intelligence synthesis component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 702, the method 700 may include receiving, by a server, real-time sensory data from a plurality of sources associated with a news event. The operations of 702 may be performed in accordance with examples as disclosed herein. In some examples, aspects of the operations of 702 may be performed by a sensory data receiver component 504 as described with reference to FIG. 5.

At 704, the method 700 may include processing, by the server, the received sensory data to generate a structured news report by applying natural language processing and machine learning algorithms to contextualize and verify the factual content of the news event. The operations of 704 may be performed in accordance with examples as disclosed herein. In some examples, aspects of the operations of 704 may be performed by a data processing component 506 as described with reference to FIG. 5.

At 706, the method 700 may include dispatching, by the server, an autonomous reporting agent to the location of the news event in response to the processed sensory data. The operations of 706 may be performed in accordance with examples as disclosed herein. In some examples, aspects of the operations of 706 may be performed by an agent dispatch component 508 as described with reference to FIG. 5.

At 708, the method 700 may include generating, by the server, a dynamic news update based on the reporting from the autonomous agent and the structured news report. The operations of 708 may be performed in accordance with examples as disclosed herein. In some examples, aspects of the operations of 708 may be performed by a dynamic update generator component 510 as described with reference to FIG. 5.

Figure 8:
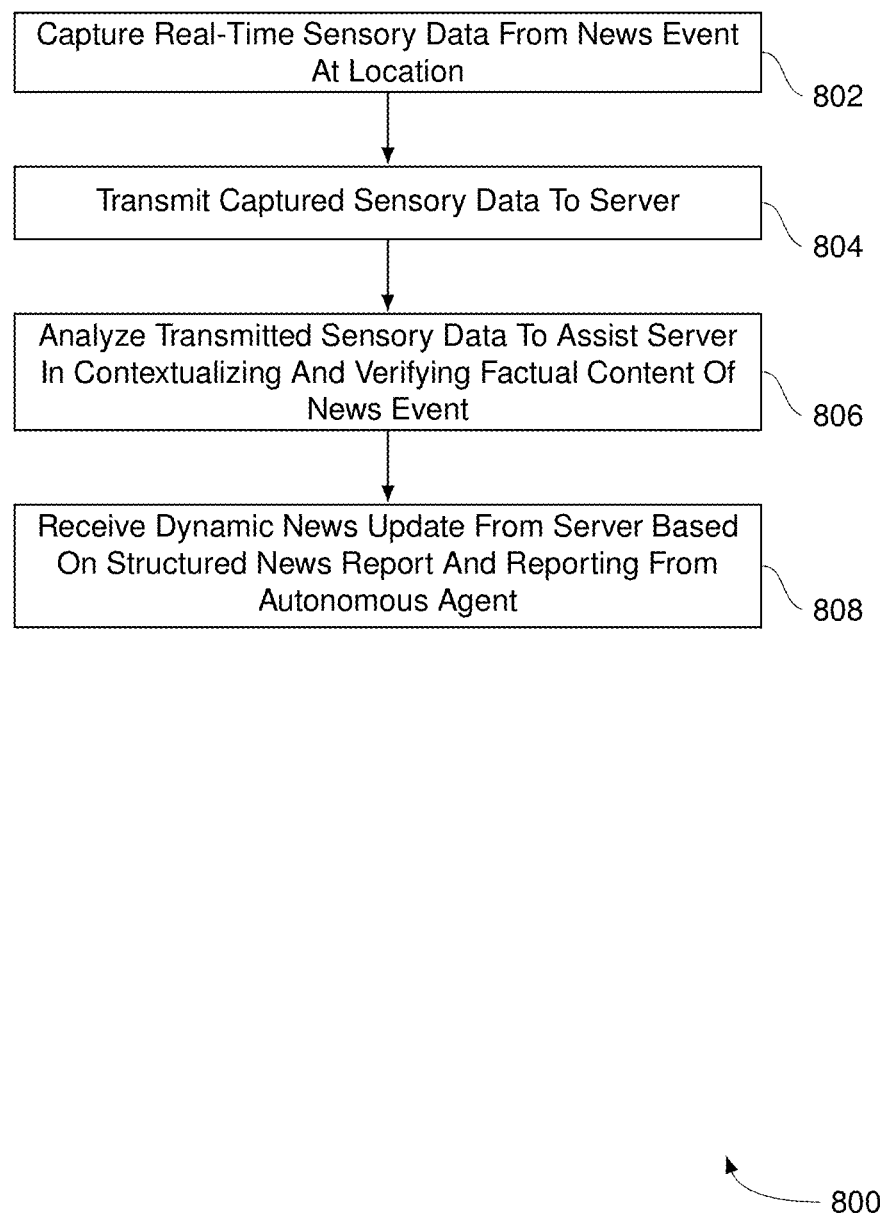

FIG. 8 shows a flowchart illustrating a method 800 that supports autonomous journalism with AI and sensory data processing in accordance with various aspects of the present disclosure. The operations of the method 800 may be implemented by one or more components of a networked computing system as described herein. For example, the operations of the method 800 may be performed by an intelligence synthesis component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 802, the method 800 may include capturing, by an autonomous reporting agent, real-time sensory data from a news event at a location. The operations of 802 may be performed in accordance with examples as disclosed herein. In some examples, aspects of the operations of 802 may be performed by a sensory data receiver component 504 as described with reference to FIG. 5.

At 804, the method 800 may include transmitting, by the autonomous reporting agent, the captured sensory data to a server. The operations of 804 may be performed in accordance with examples as disclosed herein. In some examples, aspects of the operations of 804 may be performed by a data processing component 506 as described with reference to FIG. 5.

At 806, the method 800 may include analyzing, by the autonomous reporting agent, the transmitted sensory data to assist the server in contextualizing and verifying the factual content of the news event. The operations of 806 may be performed in accordance with examples as disclosed herein. In some examples, aspects of the operations of 806 may be performed by a cross-referencing component 512 as described with reference to FIG. 5.

At 808, the method 800 may include receiving, by the autonomous reporting agent, a dynamic news update from the server based on the structured news report and the reporting from the autonomous agent. The operations of 808 may be performed in accordance with examples as disclosed herein. In some examples, aspects of the operations of 808 may be performed by a dynamic update generator component 510 as described with reference to FIG. 5.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for autonomous journalism with drones, artificial intelligence, and data processing, comprising:
    receiving, by a server, real-time event data from a plurality of sources associated with a news event, the plurality of sources including social media feeds;
    processing, by the server, the real-time event data to generate a structured news report, the processing including applying natural language processing to interpret sentiment and tone of the real-time event data, and applying machine learning algorithms trained on a dataset of historical news events to contextualize and verify factual content of the news event based on identification of entities and events within the real-time event data;
    dispatching, by the server, an autonomously-controlled flying drone equipped with cameras and sensors to a location of the news event in response to the processing of the real-time event data;
    generating, by the drone, reports of the news event;
    obtaining, by the server from the drone, the reports of the news event; and
    generating, by the server, a dynamic news update based on the reports obtained from the drone and the structured news report.

2. The method of claim 1, further comprising cross-referencing, by the server, the factual content with additional databases to enhance an accuracy of the structured news report in response to detecting inconsistencies in the real-time event data.

3. The method of claim 1, further comprising adapting, by the server, a tone and depth of the dynamic news update based on real-time audience engagement metrics collected during dissemination of the structured news report.

4. The method of claim 1, further comprising synthesizing, by the server, speech and gestures for an AI-generated avatar to deliver the dynamic news update in a studio setting, in response to the structured news report being finalized.

5. The method of claim 1, further comprising translating, by the server, the dynamic news update into multiple languages for simultaneous distribution across various media platforms in response to predefined user preferences.

6. The method of claim 1, further comprising deploying, by the server, additional drones equipped with environmental sensors to the location of the news event in response to the drone's initial assessment.

7. The method of claim 1, further comprising,
    dispatching an autonomous drone journalist equipped with a camera to provide aerial coverage of the location; and capturing, by the autonomous drone journalist, live video footage for inclusion in the structured news report.

8. The method of claim 1, further comprising generating a personalized news update tailored to a user's preferences by analyzing the user's previous interactions with news content.

9. The method of claim 1, further comprising integrating real-time interactive Q&A capabilities into the structured news report, allowing live audience members to submit questions and receive immediate, AI-generated responses related to news content.

10. The method of claim 1, wherein the drone is configured with facial recognition software to identify and interview individuals at the news event for inclusion in the dynamic news update.

11. The method of claim 1, wherein the server applies sentiment analysis to the real-time event data to determine an emotional tone of the news event and adjust a presentation style of the dynamic news update accordingly.

12. The method of claim 1, wherein the server archives the structured news report with metadata tagging for searchability and retrieval in future news aggregation and synthesis.

13. The method of claim 1, wherein the server coordinates movements of the drone with local authorities to ensure compliance with regulations and safety protocols.

14. A system configured for autonomous journalism with drones artificial intelligence, and data processing, comprising:
an autonomously-controlled flying drone equipped with cameras and sensors;
a processor;
memory coupled with the processor; and
instructions stored in the memory and executable by the processor to cause the system to:
receive real-time event data from a plurality of sources associated with a news event, the plurality of sources including social media feeds;
process the real-time event data to generate a structured news report by applying natural language processing to interpret sentiment and tone of the real-time event data, and applying machine learning algorithms trained on a dataset of historical news events to contextualize and verify factual content of the news event based on identification of entities and events within the real-time event data;
dispatch the drone to a location of the news event in response to processing the real-time event data; and
obtain, by the server from the drone, reports of the news event generated by the drone; and
generate a dynamic news update based on the reports from the drone and the structured news report.

15. The system of claim 14, wherein the instructions are further executable by the processor to cause the system to: cross-reference the factual content with additional databases to enhance an accuracy of the structured news report in response to detecting inconsistencies in the real-time event data.

16. The system of claim 14, wherein the instructions are further executable by the processor to cause the system to: adapt a tone and depth of the dynamic news update based on real-time audience engagement metrics collected during dissemination of the structured news report.

17. The system of claim 14, wherein the instructions are further executable by the processor to cause the system to: synthesize speech and gestures for an AI-generated avatar to deliver the dynamic news update in a studio setting, in response to the structured news report being finalized.

18. The system of claim 14, wherein the instructions are further executable by the processor to cause the system to: translate the dynamic news update into multiple languages for simultaneous distribution across various media platforms in response to predefined user preferences.

19. The system of claim 14, wherein the instructions are further executable by the processor to cause the system to: deploy additional drones equipped with environmental sensors to the location of the news event in response to the drone's initial assessment.

20. A non-transitory computer-readable medium storing code for autonomous journalism with drones, artificial intelligence, and data processing, the code comprising instructions executable by a processor to:
receive real-time event data from a plurality of sources associated with a news event, the plurality of sources including social media feeds;
process the real-time event data to generate a structured news report by applying natural language processing to interpret sentiment and tone of the real-time event data, and applying machine learning algorithms trained on a dataset of historical news events to contextualize and verify factual content of the news event based on identification of entities and events within the real-time event data;
dispatch an autonomously-controlled flying drone equipped with cameras and sensors to a location of the news event in response to processing the real-time event data; and
obtain, by the server from the drone, reports of the news event generated by the drone; and
generate a dynamic news update based on the reports obtained from the drone and the structured news report.

* * * * *